United States Patent
Terribile

(10) Patent No.: US 7,653,787 B2
(45) Date of Patent: Jan. 26, 2010

(54) SYSTEM FOR STORING WEB SITE NAMES AND CACHING AUDIO RESOURCES OF THE MOST VISITED WEB SITES

(75) Inventor: Mark A Terribile, Matawan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1854 days.

(21) Appl. No.: 09/850,301

(22) Filed: May 7, 2001

(65) Prior Publication Data

US 2002/0165939 A1   Nov. 7, 2002

(51) Int. Cl.
*G06F 13/00* (2006.01)
(52) U.S. Cl. .................. 711/133; 711/118; 711/119
(58) Field of Classification Search .......... 709/218, 709/238, 216, 219; 711/128, 118, 119, 133
See application file for complete search history.

(56) References Cited

U.S. PATENT DOCUMENTS

| | | | | |
|---|---|---|---|---|
| 5,960,429 A | * | 9/1999 | Peercy et al. ............ | 707/5 |
| 6,047,293 A | * | 4/2000 | Blitz .................. | 707/104.1 |
| 6,134,603 A | * | 10/2000 | Jones et al. ............ | 719/330 |
| 6,467,028 B1 | * | 10/2002 | Kelley ................ | 711/129 |
| 6,826,652 B1 | * | 11/2004 | Chauvel et al. .......... | 711/128 |
| 2001/0034792 A1 | * | 10/2001 | Swildens .............. | 709/238 |
| 2002/0099807 A1 | * | 7/2002 | Doyle ................ | 709/223 |

\* cited by examiner

*Primary Examiner*—Le Luu
(74) *Attorney, Agent, or Firm*—Harness, Dickey & Pierce, PLC

(57) ABSTRACT

A method for building a table to select r most frequently used Internet site names. The method comprises the following steps. First, receive an Internet site name. Second, convert the Internet site name into a number. Third, store the number in a table having n entries, each entry comprising a number field for storing the number, a name field for storing the received Internet site name and a count field for storing the number of times the received Internet site name has been received, where n≧r. Fourth, if the number is in the table, increment the value of the count field of the associated entry. Fifth, if the number is new and the table is not full, enter the number in an empty entry and initialize the value of the count field to a default value. Sixth, if the number is new but the table is full, replace one of the q least frequently used entries where q<n. Finally, retrieve the r most frequently used Internet site names from the table according to the value of the count field of each entry.

37 Claims, 7 Drawing Sheets

FIG. 2

| | Name | Received Count |
|---|---|---|
| n1 | http://www.usatoday.com | 1000 |
| n2 | http://www.usatoday.com/hlead.htm | 900 |
| n3 | http://www.usatoday.com/money/mfront.htm | 890 |
| n4 | http://www.atm.lucent.com | 880 |
| n5 | http://infoview.lucent.com/pubs/lt.today | 870 |
| n6 | http://infoview.lucent.com/pubs/lt.today/oldfiles/year.2001/LT.2001.085.html | 860 |
| n7 | http://infoview.lucent.com/pubs/lt.today/oldfiles/year.2001/LT.2001.082.html | 850 |
| n8 | http://infoview.lucent.com/pubs/lt.today/oldfiles/year.2001/LT.2001.081.html | 800 |
| n9 | http://infoview.lucent.com/pubs/lt.today/oldfiles/year.2001/LT.2001.079.html | 780 |
| n10 | http://infoview.lucent.com/pubs/lt.today/oldfiles/year.2001/LT.2001.078.html | 760 |
| n11 | http://infoview.lucent.com/pubs/lt.today/oldfiles/year.2001/LT.2001.077.html | 740 |
| n12 | http://www.astro.umd.edu/~fleming/latest_news.html | 720 |
| n13 | http://www.astro.umd.edu/~fleming | 710 |
| n14 | http://www.astro.umd.edu/~hcohen/FAQ.html | 700 |
| n15 | http://cdd.dnrc.bell-labs.com | 600 |
| n16 | http://cdd.dnrc.bell-labs.com/town.html | 500 |
| n17 | http://cdd.dnrc.bell-labs.com/resources.html | 400 |
| n18 | http://cdd.dnrc.bell-labs.com/technology.html | 300 | n1–n5: irreplaceable
n6–n20: replaceable

|   | Base 16 hashed number | name | Received Count |
|---|---|---|---|
| h1 | 483a24a9 | http://www.usatoday.com | 1000 |
| h2 | 27a0b8c | http://www.usatoday.com/hlead.htm | 900 |
| h3 | a3338111 | http://www.usatoday.com/money/mfront.htm | 890 |
| h4 | 94c1af05 | http://www.atm.lucent.com | 880 |
| h5 | 37a7dc4c | http://infoview.lucent.com/pubs/lt.today | 870 |
| h6 | 6215a6d1 | http://infoview.lucent.com/pubs/lt.today/oldfiles/year.2001/LT.2001.085.htm | 860 |
| h7 | 75fda6d1 | http://infoview.lucent.com/pubs/lt.today/oldfiles/year.2001/LT.2001.082.htm | 850 |
| h8 | 7df5a6d1 | http://infoview.lucent.com/pubs/lt.today/oldfiles/year.2001/LT.2001.081.htm | 800 |
| h9 | 4221b2d1 | http://infoview.lucent.com/pubs/lt.today/oldfiles/year.2001/LT.2001.079.htm | 780 |
| h10 | 45d9b2d1 | http://infoview.lucent.com/pubs/lt.today/oldfiles/year.2001/LT.2001.078.htm | 760 |
| h11 | 6df1b2d1 | http://infoview.lucent.com/pubs/lt.today/oldfiles/year.2001/LT.2001.077.htm | 740 |
| h12 | 9fc0643b | http://www.astro.umd.edu/~fleming/latest_news.html | 720 |
| h13 | 455cac4a | http://www.astro.umd.edu/~fleming | 710 |
| h14 | 32073b0e | http://www.astro.umd.edu/~hcohen/FAQ.html | 700 |
| h15 | dfbf950a | http://cdd.dnrc.bell-labs.com | 600 |
| h16 | 267ce247 | http://cdd.dnrc.bell-labs.com/town.html | 500 |
| h17 | 8e15b8dc | http://cdd.dnrc.bell-labs.com/resources.html | 400 |
| h18 | fa2465bb | http://cdd.dnrc.bell-labs.com/technology.html | 300 |
| h19 | e7206159 | http://cdd.dnrc.bell-labs.com/documents.html | 200 | h1–h5: irreplaceable
h6–h20: replaceable

```
401 unsigned long name_hash(const char *p)
    {
402 unsigned long h = 0;
403 unsigned int m;
404 while( *p ) {
405     m = *p++;
406     m = m ^ m << 1;
407     m = m ^ m << 2;
408     m = m ^ m << 4;
409     h = m ^ ( ( ( h >> 9 ) | ( h << 23 ) ) );
    }
410 return h;
    }
```

FIG. 5
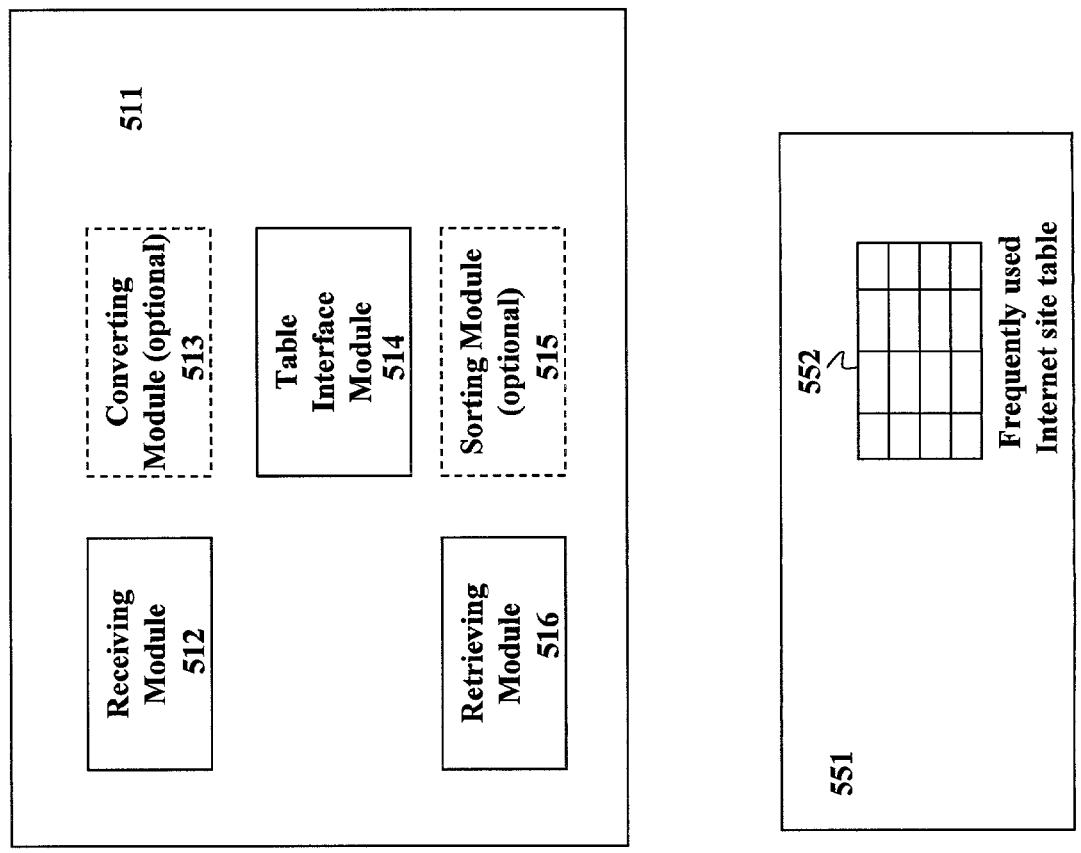
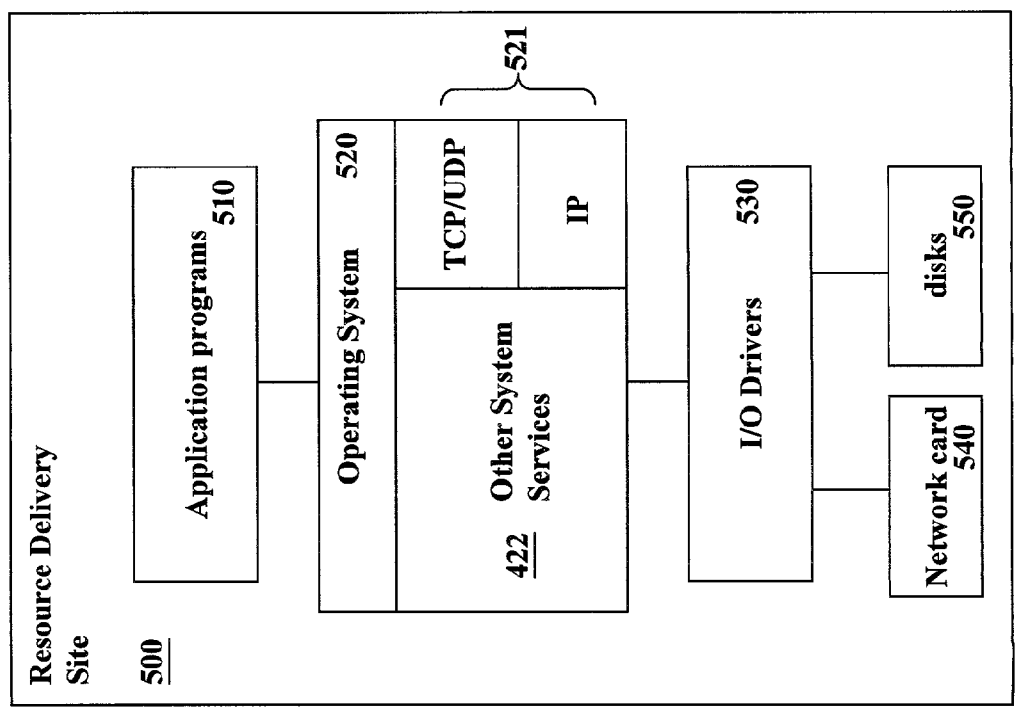

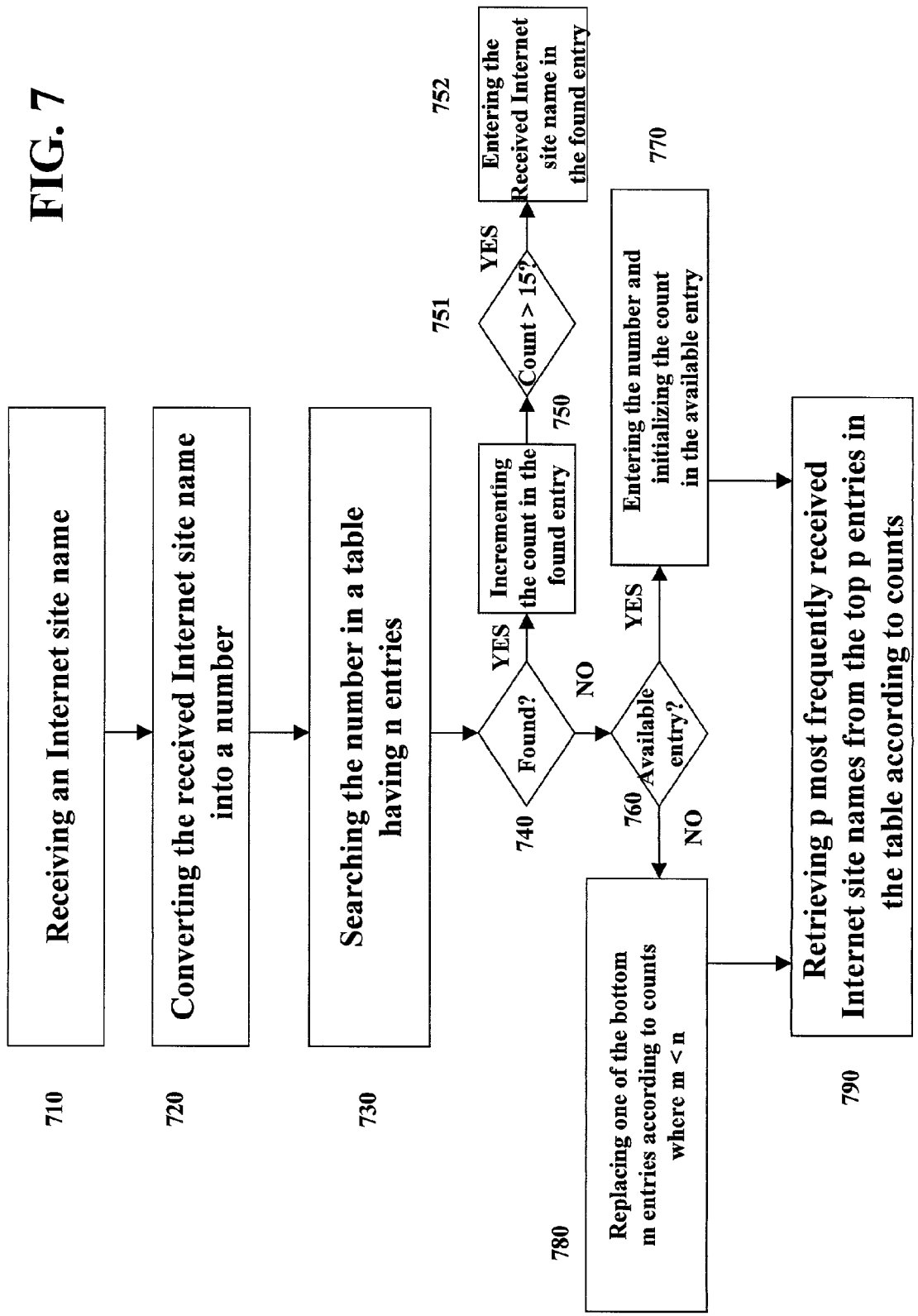

US 7,653,787 B2

SYSTEM FOR STORING WEB SITE NAMES AND CACHING AUDIO RESOURCES OF THE MOST VISITED WEB SITES

FIELD OF THE INVENTION

The present invention relates to data communication and, more particularly to packet communication over the Internet.

BACKGROUND OF THE INVENTION

Over the Internet, a user can access any resource, such as a Hypertext Markup Language (HTML) file, available over the Internet on any host by entering a URL (Uniform Resource Locator) in an Internet browser. For the convenience of users, a resource provider may list all its resources in a site (the resource delivery site), but store the resources in many other sites (the resource providing sites). When a user requests a resource from the resource delivery site, the resource delivery site, generally, checks if there is a valid cached copy. If the cached copy is valid, the resource delivery site delivers the cached copy to the user. Otherwise, the resource delivery site obtains another copy of the resource from the corresponding resource providing site and updates the cached copy. A cached copy is invalid if it becomes unauthorized by the resource providing site. For example, a cached copy is invalid if its existence has exceeded an interval specified by the resource providing site. The advantage of the cache ability is that it enables a faster delivery for the next request for the same resource if the cached copy at the resource delivery site is valid. Since the cached copy may become invalid before the next request has been received, it is desirable to identify frequently used (hot) Internet sites, so that the resource delivery site can obtain a valid cached copy of resources from those Internet sites in advance. In the following, "Internet site name" and "resource name" are used interchangeably because a URL usually specifies both the Internet site name and the resource name. Also, a "resource delivery site" and a "resource providing site" are used to represent the hosts at the respective sites.

One way of identifying frequently used Internet sites is to list all Internet site names received during a given period and count the number of times each Internet site name has been received. Then select those which have a count exceeding a threshold as the most frequently used Internet sites. However, the list may be long and, thus, require a lot of memory space and computing power. Furthermore, if a new Internet site name is received but the memory has already exhausted, the new Internet site name is usually dropped even if that Internet site would be most frequently used.

SUMMARY OF THE INVENTION

The above problems are addressed by a method for building a table having n entries to select most frequently used Internet sites at a resource delivery site, so that r most frequently used Internet site names can be identified and the corresponding resources can be cached in advance where $r \leq n$. The method comprises the following steps: receive from a packet an Internet site name among m Internet site names that can be received, store the Internet site name in an entry of the table if the name is not in the table, and counting the number of times the Internet site name has been received, wherein $n<m$ and if the Internet site name is not in the table and the table is full, an entry of the table is replaced.

An embodiment is a host that comprises a receiver for receiving an Internet site name, a memory for storing a table having n entries, a table interface for counting the number of times the received Internet site name has been received and for storing the received Internet site name in the table wherein if the table is full and the received Internet site name is not in the table, the table interface replaces one of the q least frequently used Internet site names, where $q<n$, and a retriever for retrieving r most frequently used Internet site names where $r \leq n$. The host may optionally comprise a sorter for sorting the table in descending order according to the number of times each Internet site name has been received.

Another embodiment is a method for building a table to select r most frequently used Internet site names at a resource delivery site, so that the resource delivery site can cache the resources of the r most frequently used Internet sites in advance. The method comprises the following steps. First, receive an Internet site name. Second, convert the Internet site name into a number. Third, store the number in a table having n entries, each entry comprising a number field for storing the number, a name field for storing the Internet site name and a count field for storing the number of times the Internet site name has been received, where $n \geq r$. Fourth, if the number is in the table, increment the value of the count field of the associated entry. Fifth, if the number is new and the table is not full, enter the number in an empty entry and initialize the value of the count field to a default value. Sixth, if the number is new but the table is full, replace one of the q least frequently used entries where $q<n$. Finally, retrieve the r most frequently used Internet site names from the table according to the value of the count field of each entry.

BRIEF DESCRIPTION OF THE DRAWINGS

The present invention will be more fully appreciated from a consideration of the following Detailed Description, which should be read in light of the accompanying drawings in which:

FIG. 2 shows an illustrative table in accordance with the principles of the invention;

FIG. 3 shows another illustrative table in accordance with the principles of the invention;

FIG. 4 shows an illustrative hash function for converting a received Internet site name into a number in accordance with the principles of the invention;

FIG. 5 shows an illustrative resource delivery site in accordance with the principles of the invention;

FIG. 7 shows an illustrative flowchart for retrieving most frequently used Internet site names in accordance with the principles of the invention.

DETAILED DESCRIPTION

Figure 1:
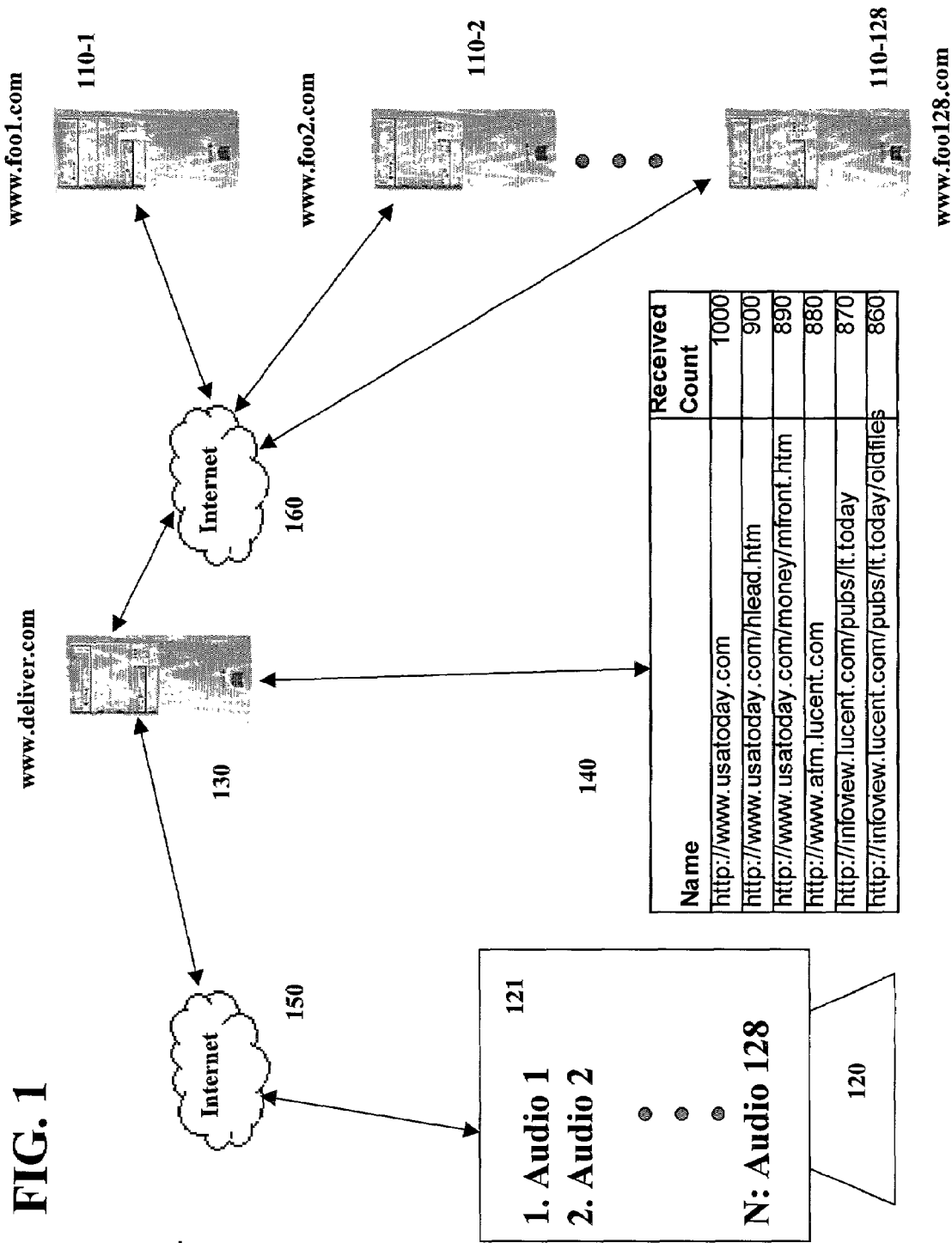
FIG. 1 shows an exemplary resource delivery system in accordance with the principles of the invention.

An exemplary resource delivery system in accordance with the principles of the invention is shown in FIG. 1. Other than the inventive concepts, the equipment and network used in FIG. 1 are known in the art and not discussed herein. Furthermore, the method and steps described herein can be implemented using conventional computer programming techniques, which are not discussed herein. System 100 of FIG. 1 illustratively shows a portion of a data network. The illustrative system comprises user host 120, resource delivery site 130, and resource providing sites 110-1, 110-2, . . . , and 110-128. They are all connected via the Internet shown as 150 and 160 in the figure. User host 120 executes browser 121 for accessing a resource (Internet site) available over the Internet. Illustratively, user host 120 has accessed the home page of resource delivery site 130, which is identified by the URL of "http://www.delivery.com." As displayed by browser 121, the home page provides 128 hyperlinks to 128 audio files, Audios 1-128, respectfully supplied by resource providing sites 110-1 to 110-128. Upon a request (for example, by clicking on a hyperlink) for an audio file from the user of user host 120, resource delivery site 130 obtains the audio file from the corresponding resource providing site, delivers the audio file to user host 120, and usually caches that audio file, so that resource delivery site 130 can deliver the cached copy for a request for the same file to reduce the delivery time. It should be noted that the cached copy must be valid when the request for the same file has been received. Otherwise, resource delivery site 130 must obtain another copy from the corresponding resource providing site. Thus, it is advantageous to identify a frequently used Internet site and obtain a valid cached copy of the resource in advance to expedite the delivery for the next request. As known in the art, each hyperlink specifies a URL which comprises an Internet site name available over the Internet. In accordance with the principles of the invention, resource delivery site 130 comprises a memory (not shown) for storing table 140. Each entry of table 140 comprises a name field for a received Internet site name and a received count field for counting the number of times the associated Internet site name has been received (accessed). Illustratively resource delivery 130 caches the resources (not shown) from the seven most frequently used (received) Internet sites according to the value of the received count field of each entry in table 140.

The detail of table 140 is shown in FIG. 2, which illustratively contains 20 entries from rows n1 to n20. The seven most frequently used Internet site names are illustratively those in rows n1-n7. If a received Internet site name is in the table, resource delivery site 130 increments the value of the received count field of the entry associated with the received Internet site name. If the received Internet site name is new (not in the table) and the table is not full, resource delivery site 130 selects an empty entry for storing the received Internet site name and the value of the received count field of the selected entry is initialized to 1. If the received Internet site name is new and the table is full, one of the entries is replaced. (The replacement scenario is detailed below.) When an entry is empty, its received count is initialized to 0. It should be noted that other numbers such as −1 can be used to indicate that an entry is empty. Similarly, other numbers such as 0 can be used to indicate that a new name has been entered into an entry.

This paragraph describes in more detail the scenario when the received Internet site name is new and the table is full. In accordance with the principles of the invention, resource delivery site 130 divides the 20 table entries in table 140 as detailed in FIG. 2 into two categories: irreplaceable and replaceable. The number of entries allocated to the irreplaceable category is pre-assigned. For example, five entries are allocated to the irreplaceable category in FIG. 2. These five entries are n1-n5 and contain the five most frequently used Internet site names. The remaining 15 entries, n6-n20, that contain the 15 least frequently used Internet site names are replaceable. When table 140 is full and a new Internet site name is received, resource delivery site 130 randomly replaces one of the 15 least frequently used entries. Other replacement rules can be used as well. For example, resource delivery site 130 may replace the least frequently used one among the 15 least frequently used entries. Illustratively, the number of the table entries is limited to 20 even though at least 128 possible Internet site names can be received.

Another embodiment of table 140 is shown in FIG. 3, where an additional field containing a base 16 hashed number is added for each entry. In accordance with the principles of the invention, when resource delivery site 130 receives an Internet site name, it converts the Internet site name into a number by using a hash function and stores the number in the table. Advantageously, the searching time for the number is reduced because comparing two numbers is generally faster than comparing two Internet site name strings.

An illustrative hash function is shown in FIG. 4. At line 401, a hash function, name_hash( ), is defined along with its input string which is saved in an address pointed to by pointer p. Lines 402 and 403 declare two local variables h and m. The variable h is used for holding the hash number and is initialized to 0 at line 402. Lines 404-409 are the body of a loop. For each iteration in the loop, a character is read into variable m from the input string pointed to by pointer p and pointer p is incremented to point to the next character in the input string at line 405. At line 406, m is shifted to the left by one position and exclusive-ORed with the content of m before the shift, and the result is stored back to m. Lines 407 and 408 perform similar operations on m as that of line 406 except that the number of positions shifted are 2 and 4, respectively. At line 409, h is shifted to the right by 9 positions. The result is ORed with the result of shifting h to the left by 23 positions. The result of the OR operation is then exclusive-ORed with m and is saved in h. When all the characters in the input string are processed, h is returned to the caller as the corresponding hash number for the input string. The OR, exclusive-OR, and shifting operations are known in the art and are not described herein. The base 16 hash numbers in FIG. 3 are derived using the C program in FIG. 4. Other converting methods such as summing all characters in the input string can be used as well.

Referring now to FIG. 5, an illustrative resource delivery site in accordance with the principles of the invention is shown. Resource delivery site 500 comprises hardware (only disks and a network card are shown) and software. The hardware typically comprises a central processing unit (CPU) (not shown), main memory (not shown), secondary memory such as disks 550, and input/output (I/O) cards such as network card 540, as known in the art. For illustration purposes, the software comprises application programs 510, operating system 520, and I/O drivers 530. Operating system 520 comprises TCP/IP protocol suite 521 and other system services 522. Application programs 510 generally invoke system services from operating system 520 to access I/O drivers 530 and the associated I/Os such as network card 540 and disks 550. Frequently used Internet site table builder 511, which is one of the application programs 510, builds table 552 which have n entries and is stored in disk 551 which is one of the disks 550 and selects r most frequently used Internet site names from table 552. Each entry comprises three fields: a number, a name, and a received count. For an example of table 552, see FIG. 3. Frequently used Internet site table builder 511 comprises receiving module 512, table interface module 514, and retrieving module 516. Optionally, frequently used Internet site table builder 511 also comprises converting module 513 and sorting module 515. Receiving module 512 invokes TCP/UDP services from operating system 520 to receive an Internet site name from a packet. The received Internet site name usually is the URL in the packet. Receiving module 512 may also receive the Internet site name from another application program. Table interface module 514 stores the received Internet site name in table 552 under the following three different scenarios. First, if the table is not full and the received Internet site name is new, table interface module 514 selects an empty entry and stores the Internet site name in that entry. The value of the received count field is initialized to 1. Second, if the received Internet site name is found in an entry of table 552, table interface module 514 increments the value of the received count field of that entry. Last, if table 552 is full and the received Internet site name is new, table interface module 514 randomly replaces one of the q least frequently used Internet site names, where q<n. When an entry is replaced, the value of the associated received count field is initialized to 1. Other rules can be used as well. For example, table interface module 514 can replace the least frequently used one among the q least frequently used Internet site names. In any case, when table 552 is full and the received Internet site name is new, the (n−q) most frequently used Internet site names are not replaced. Retrieving module 516 retrieves the r most frequently used Internet site names from table 552. If optional sorting module 515 is incorporated, table 552 is sorted in a descending order according to the value of the received count field of each entry. In the preferred embodiment, a bubble sort, as known in the art, is executed every time an Internet site name is received. When the table is sorted as described above, the r most frequently used Internet site names are the first r entries in table 552. It should be noted that the first r entries in table 552 may contain most but not all of the r most frequently used Internet site names if a bubble sort is used and the first r entries are retrieved before table 552 is completely in order. Sorting module 515 can sort table 552 in an ascending order and can use other sorting methods such as insertion sorts as well.

This paragraph describes the operation when optional converting module 513 is incorporated. Converting module 513 converts the received Internet site name into a number, and passes the received Internet site name and the number to table interface module 514. In this case, table interface module 514 searches table 552 for the number. If the number is found in an entry, table interface module 514 increments the received count in that entry. Furthermore, if the name field of the found entry is empty and the associated received count is over a threshold (for example 15), table interface module 514 also stores the received Internet site name in that entry. If table 552 is not full and the number is not found, table interface module 514 selects an empty entry, stores the number, and initializes the value of the received count field to 1. Table interface module 514 does not store the received Internet site name at this time. If the table is full and the number is new, table management module 514 replaces one of the q least frequently used entries and initializes the value of the received count field of the replaced entry to 1. Again, the received Internet site name is not stored at this time. It should be noted that the received Internet site name can be stored at the same time as the number but it may increase the table management processing time.

Figure 6:
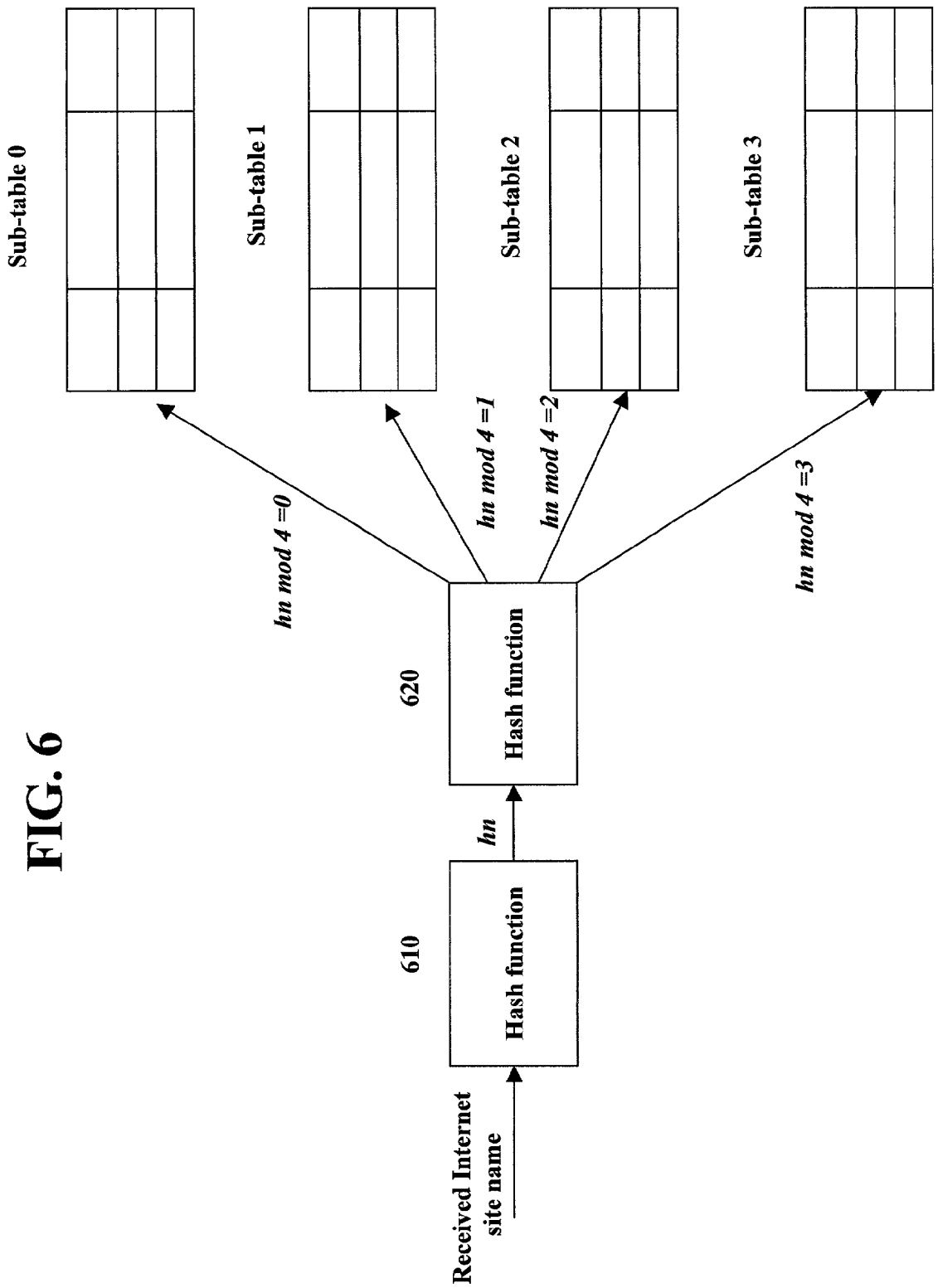
FIG. 6 shows an illustrative table with four sub-tables in accordance with the principles of the invention.

Referring now to FIG. 6, another illustrative embodiment of table 140 is shown. Here, table 140 includes four sub-tables 0-3. A received Internet site name is first converted to a number, hn, by hash function 610. The number is modulo operated by a number of four at MOD function 620. (Modulo operations are known in the art and are not described herein.) If the result is k, sub-table k is used to store the number and/or the received Internet site name. For example, if the result is 1, sub-table 1 is used. Under this arrangement, each sub-table is limited to n/4 entries and the number of the least frequently used entries that can be replaced is limited to q/4. If n and q are not divisible by 4, some tables may have at most three more entries than others in total and in the replaceable category. The r most frequently used name is selected by ranking all entries in the four tables according to the value of the received count field of each entry.

Turning to FIG. 7, a flow chart is presented to further describe the operation when a received Internet site name is converted into a number. At block 710, an Internet site name is received from a packet. The received Internet site name is then converted to a number at block 720. At block 730, a table is searched for the number. This table has n entries and each entry comprises a number field for the number, a name field for the received Internet site name, and a count field for counting the number of times the received Internet site name has been received. If the outcome of decision block 740 is YES (the number is found in an entry), at block 750, the value of the count field of the found entry is incremented. The value of the count field of the found entry is compared to a threshold (15 in the example) at decision block 751. If it is greater than the threshold, the received Internet site name is also entered in the name field of the found entry at block 752. If the outcome from decision block 740 is NO, decision block 760 checks if there is an empty entry in the table, if the answer is YES, the number is entered in the empty entry and the received count of that entry is initialized at block 770. If the answer from decision block 760 is NO (the table is full), an entry among the q least frequently used entries is replaced, where q<n. In either case, at block 790, the r most frequently used names according received counts are retrieved from the table. It should be noted that block 790 does not have to be executed for every received name. It can be executed off line or by another processor.

A method or an apparatus for selecting Internet hot sits other than those disclosed can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention.

What is claimed is:

1. A caching method comprising the steps of:
   (a) receiving an Internet site name;
   (b) storing the Internet site name in an entry of a table having n entries if the Internet site name is not in the table;
   (c) counting the number of times the Internet site name has been received, and if the Internet site name is new and the table is full, selecting an entry from a set of replaceable entries in the table, where the table includes both replaceable and irreplaceable entries;
   (d) replacing the selected entry with the new entry; and
   (e) caching a resource corresponding to at least one of a most frequently used Internet sites r where r≦n, wherein the cached resource is an audio file.

2. The method of claim 1 wherein the Internet site name is a URL (Uniform Resource Locator).

3. The method of claim 1 wherein each entry of the table has a name field for storing the Internet site name and a count field for storing the number of times the Internet site name has been received.

4. The method of claim 3 further comprising the step of retrieving r most frequently used Internet site names according to the value of the count field of each entry.

5. The method of claim 1 wherein if the table is full and the Internet site name is not in the table, replace one of the q least frequently used entries according to the value of the count field of each entry.

6. The method of claim 1 wherein the cached resource is a Hypertext Markup Language (HTML) file.

7. An apparatus for caching resources of r most frequently used Internet site names, wherein the resources include an audio file, comprising:
(a) a memory for storing a table having n entries where n≧r, where r is the number of most frequently used Internet sites and each entry comprises a name field; and
(b) a processor for,
receiving an Internet site name,
storing the Internet site name into the name field of an entry in the table,
selecting an entry from a set of replaceable entries in the table if the table is full and the Internet site name is not in the table, where the table includes both replaceable and irreplaceable entries; and
replacing the selected entry with the Internet site name entry.

8. The apparatus of claim 7 wherein the Internet site name is a URL (Uniform Resource Locator).

9. The apparatus of claim 7 wherein if the table is full and the Internet site name is not in the table, the processor randomly selects one of q at least frequently used entries for replacement from the set of replaceable entries.

10. The apparatus of claim 7 wherein if the table is full and the Internet site name is not in the table, the processor replaces the least frequently used entry among q least frequently used entries from the set of replaceable entries.

11. The apparatus of claim 7 wherein each entry in the table further comprises a count field for storing the number of times the associated Internet site name in the entry has been received.

12. The apparatus of claim 11 wherein if the Internet site name is in one of the entries, the processor increments the value of the count field.

13. The apparatus of claim 12 wherein the processor sorts the entries in the table into an order according to the value of the count field of each entry.

14. The apparatus of claim 13 wherein the order is descending, whereby the r most frequently used Internet site names are in the first r entries.

15. The apparatus of claim 13 wherein the sorting method is a bubble sort method.

16. The apparatus of claim 11 wherein the processor retrieves the r most frequently used Internet site names from the top r entries according to the value of the count field of each entry.

17. The apparatus of claim 7 wherein the resources include an HTML file.

18. An apparatus for caching resources of r most frequently used Internet site names, wherein the resources include an audio file, the apparatus comprising:
(a) a receiver for receiving an Internet site name;
(b) a processor for converting the Internet site name into a hash number and storing the number into an entry in a table; and
(c) a memory for storing the table having n entries where n≧r where r is the number of most frequently used Internet site names, each entry in the table comprising a number field for the number, a name field for the Internet site name and a count field for counting the number of times the Internet site name is received, wherein
(d) the processor further selects an entry from a set of replaceable entries in the table if the table is full and the number is not in the table and replaces the selected entry with the hash number entry according to the value of the count field of each entry the table including both replaceable and irreplaceable entries.

19. The apparatus of claim 18 wherein the Internet site name is a URL (Uniform Resource Locator).

20. The apparatus of claim 18 wherein if the number is in one of the entries, the processor increments the value of the count field.

21. The apparatus of claim 18 wherein the processor retrieves the r most frequently used Internet site names from the top r entries according to the value of the count field of each entry.

22. The apparatus of claim 18 wherein the processor sorts the entries in the table into an order according to the value of the count field of each entry.

23. The apparatus of claim 18 wherein if the number is not in the table and the table is not full, the processor stores the number and the Internet site name in the respective fields of an empty entry.

24. The apparatus of claim 18 wherein if the number is in an entry and the value of the count field of that entry is greater than a threshold, the processor stores the Internet site name in that entry.

25. The apparatus of claim 18 wherein if the table is full and the number is not in the table, the processor randomly selects one of the q least frequently used entries for replacement from the set of replaceable entries.

26. The apparatus of claim 18 wherein if the table is full and the number is not in the table, the processor replaces the entry with the smallest value of the count field among q least frequently used entries from the set of replaceable entries.

27. The apparatus of claim 18 wherein the table comprises q sub-tables where n>q>1, each sub-table has n/q entries and pointed to by an address ranging from 0 to q−1, the number is searched or stored in the sub-table pointed to by the address produced by taking a modulo operation on the number by q, if the sub-table is full and the number is not in the sub-table, the processor replaces one of the bottom m/q entries according to the value of the count field of each entry, and retrieves the r most frequently used Internet site names from the top r entries among the q sub-tables according to the value of the count field of each entry.

28. The apparatus of claim 18 wherein the resources include an HTML file.

29. A computer readable medium having computer program logic recorded thereon for storing resources of r most frequently used Internet site names, wherein the resources include an audio file, the computer program logic comprising:
(a) a computer program code segment for receiving an Internet site name;
(b) a computer program code segment for converting the received Internet site name into a hash number;
(c) a computer program code segment for storing the number in the table having n entries where n ≧r each entry in the table comprising a number field for the number, a name field for the received Internet site name and a count field for counting the number of times the Internet site name has been received, wherein
(d) the computer code segment for storing further selects an entry from a set of replaceable entries in the table if the table is full and the number is not in the table and replaces the selected entry with the new entry according to the value of the count field of each entry the table including both replaceable and irreplaceable entries.

30. The computer readable medium of claim 29 wherein the received Internet site name is a URL (Uniform Resource Locator).

31. The computer readable medium of claim 29 wherein if the number is in one of the entries, the storing computer program code segment increments the value of the count field.

32. The computer readable medium of claim 29 wherein the logic further comprises a computer program code segment for retrieving the r most frequently used Internet site names from the top r entries according to the value of the count field of each entry.

33. The computer readable medium of claim 29 wherein the logic further comprises a computer program code segment for sorting the entries in the table into an order according to the value of the count field of each entry.

34. The computer readable medium of claim 29 wherein if the number is in the table and the table is not full, the storing computer program code segment stores the number and the received Internet site name in the respective fields of an empty entry.

35. The computer readable medium of claim 29 wherein if the number is in an entry and the value of the count field in that entry is greater than a threshold, the storing computer program code segment stores the received Internet site name in the name field of that entry.

36. The computer readable medium of claim 29 wherein if the table is full and the number is not in the table, the storing computer program code segment randomly selects one of q least frequently used entries for replacement from the set of replaceable entries.

37. The computer readable medium of claim 29 wherein if the table is full and the number is not in the table, the storing computer program code segment replaces the entry with the smallest received count among q least frequently used entries.

* * * * *

UNITED STATES PATENT AND TRADEMARK OFFICE
CERTIFICATE OF CORRECTION

PATENT NO. : 7,653,787 B2 Page 1 of 1
APPLICATION NO. : 09/850301
DATED : January 26, 2010
INVENTOR(S) : Mark A Terribile It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2153 days.

Signed and Sealed this

Twenty-eighth Day of December, 2010

David J. Kappos
*Director of the United States Patent and Trademark Office*